(12) United States Patent
Beresnevichiene et al.

(10) Patent No.: US 8,650,637 B2
(45) Date of Patent: Feb. 11, 2014

(54) NETWORK SECURITY RISK ASSESSMENT

(75) Inventors: Yolanta Beresnevichiene, Bristol (GB); Fotios Tsifountidis, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 51 days.

(21) Appl. No.: 13/217,010

(22) Filed: Aug. 24, 2011

(65) Prior Publication Data
US 2013/0055394 A1    Feb. 28, 2013

(51) Int. Cl.
*G06F 11/00*    (2006.01)
*G06F 12/14*    (2006.01)
*G06F 12/16*    (2006.01)
*G08B 23/00*    (2006.01)

(52) U.S. Cl.
USPC .............................................. 726/22; 726/23

(58) Field of Classification Search
None
See application file for complete search history.

(56) References Cited

U.S. PATENT DOCUMENTS

| | | | |
|---|---|---|---|
| 7,747,494 B1 | 6/2010 | Kothari et al. | |
| 8,019,689 B1* | 9/2011 | Nachenberg | 705/64 |
| 8,201,255 B1* | 6/2012 | Nachenberg | 726/24 |
| 8,205,258 B1* | 6/2012 | Chang et al. | 726/22 |
| 8,302,191 B1* | 10/2012 | Conrad et al. | 726/23 |
| 8,321,936 B1* | 11/2012 | Green et al. | 726/23 |
| 8,364,776 B1* | 1/2013 | Conrad | 709/216 |
| 2004/0148281 A1* | 7/2004 | Bates et al. | 713/200 |
| 2004/0225627 A1* | 11/2004 | Botros et al. | 706/16 |
| 2005/0193430 A1 | 9/2005 | Cohen et al. | |
| 2006/0015934 A1* | 1/2006 | Wool | 726/11 |
| 2006/0026044 A1* | 2/2006 | Smith, II | 705/4 |
| 2006/0185018 A1* | 8/2006 | Saretto et al. | 726/25 |
| 2007/0016951 A1* | 1/2007 | Piccard et al. | 726/24 |
| 2007/0038677 A1* | 2/2007 | Reasor et al. | 707/200 |
| 2007/0150957 A1* | 6/2007 | Hartrell et al. | 726/24 |
| 2008/0047016 A1* | 2/2008 | Spoonamore | 726/25 |
| 2008/0082662 A1* | 4/2008 | Dandliker et al. | 709/225 |
| 2008/0109473 A1* | 5/2008 | Dixon et al. | 707/102 |
| 2008/0141372 A1* | 6/2008 | Massey et al. | 726/23 |
| 2008/0148398 A1 | 6/2008 | Mezack et al. | |

(Continued)

FOREIGN PATENT DOCUMENTS

KR    2005100278 A    * 10/2005

OTHER PUBLICATIONS

Washington Navy Yard, D. C., and Booz Allen Hamilton. "Software Security Assessment Tools Review", Mar. 2, 2009, 145 pages.*

(Continued)

*Primary Examiner* — Andrew Nalven
*Assistant Examiner* — Walter Malinowski

(57) ABSTRACT

A security risk of a computer network is assessed by simulating a threat environment of the computer network, wherein the threat environment includes a vulnerability and a website, simulating a protection environment of the computer network and a computer system in the computer network, and simulating network activity of the computer system. The security risk of the computer network is assessed based at least in part on the simulated threat environment, the simulated protection environment, and the simulated network activity of the computer system.

15 Claims, 8 Drawing Sheets

(56) References Cited

U.S. PATENT DOCUMENTS

| | | | |
|---|---|---|---|
| 2008/0306896 A1* | 12/2008 | Dash | 706/52 |
| 2009/0187442 A1* | 7/2009 | Kohanim et al. | 705/7 |
| 2009/0216760 A1* | 8/2009 | Bennett | 707/5 |
| 2009/0326899 A1* | 12/2009 | Ghorbani et al. | 703/13 |
| 2009/0328209 A1* | 12/2009 | Nachenberg | 726/22 |
| 2010/0042931 A1* | 2/2010 | Dixon et al. | 715/738 |
| 2010/0186088 A1* | 7/2010 | Banerjee et al. | 726/23 |
| 2010/0235915 A1* | 9/2010 | Memon et al. | 726/23 |
| 2010/0293617 A1* | 11/2010 | Wool | 726/25 |
| 2010/0332508 A1* | 12/2010 | Gustafson et al. | 707/759 |
| 2012/0036580 A1* | 2/2012 | Gorny et al. | 726/25 |

OTHER PUBLICATIONS

Lu, "BLADE: An Attack-Agnostic Approach for Preventing Drive-By Malware Infections", CCS'10, Oct. 4-8, 2010, Chicago, Illinois, pp. 440-450.*

"eSafe Web Threat Analyzer"; http://www.vistawiz.com/products/esafe/solutions/wta/default.php.

Jul. 2010; Using Risk Modeling & Attack Simulation for Proactive Cyber Security, Skybox Security White Paper, www.skyboxsecurity.com.

* cited by examiner

NETWORK SECURITY RISK ASSESSMENT

BACKGROUND

As the web becomes increasingly popular and used for day-to-day operations, attackers have shifted from techniques such as spam to the web to lure victims and exploit vulnerabilities. Organizations implement security strategies to protect their information technology (IT) infrastructures against such attacks and secure the browsing activities of their employees. It is beneficial to assess the security risk of such security strategies because the assessment can be used to evaluate and improve the security strategies.

DETAILED DESCRIPTION

The present subject matter is now described more fully with reference to the accompanying figures, in which several examples of the subject matter are shown. The present subject matter may be embodied in many different forms and should not be construed as limited to the examples set forth herein. Rather these examples are provided so that this disclosure will be complete and will fully convey principles of the subject matter.

A system assesses security risks of an entity's protections against web-based attacks and malware spread via the web. The risk assessment is performed by means of modeling the external threat environment (e.g., vulnerabilities, malware, infected web traffic), the entity's internal protections (e.g., web gateways, update management, anti-virus applications), and the web browsing behavior patterns within the entity, and by running simulations on the model. The system can also provide decision support by means of model simulations that test the effectiveness of various mitigation strategies at reducing web-based attacks and malware.

Example System Architecture

Figure 1:
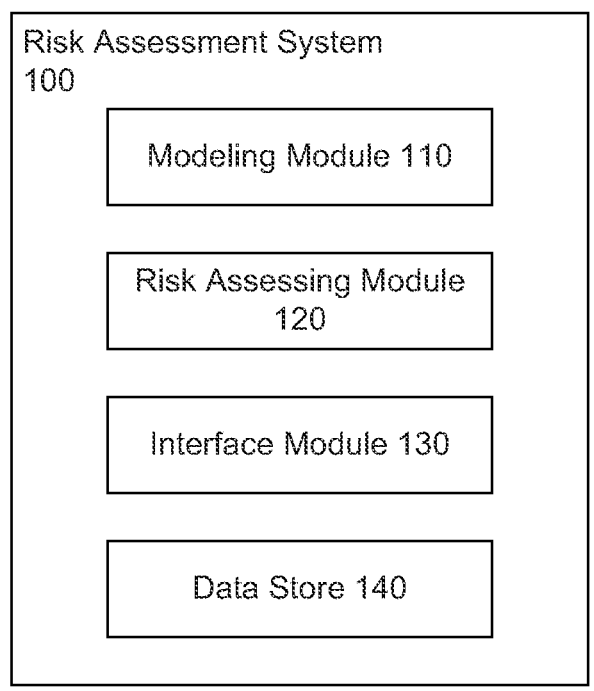
FIG. 1 is a diagram of an example of an architecture for a risk assessment system.

FIG. 1 illustrates one example of a system architecture for a risk assessment system 100 that provides risk assessment of an entity's protections against web-based attacks and malware. The risk assessment system 100 includes a modeling module 110, a risk assessing module 120, an interface module 130, and a data store 140, each of which includes computer program logic and can be implemented in hardware, firmware, and/or software.

The modeling module 110 constructs (or generates) a web infection model. The web infection model captures the following aspects: the external threat environment (e.g., number and severity of vulnerabilities, malware exploiting the vulnerabilities), the entity's internal protections for minimizing web infection risk (e.g., mitigation mechanisms such as anti-virus applications and firewalls), and the web browsing behavior patterns of the entity's users (e.g., types of websites and associated traffic volumes). The model is constructed using empirical data such as security reports generated based on large volumes of actual web traffic, historical vulnerability data from sources such as the National Vulnerability Database, and web browsing activity history. The web infection model will be described in further detail below with regard to FIGS. 3 through 7.

The risk assessing module 120 runs simulations on the web infection model to assess network security risks faced by the entity's computer network. The risk assessing module 120 simulates one or more users browsing various websites from computer systems within the entity's computer network, and analyzes the simulation results (e.g., malware instances infecting the users' computer systems resulted from the browsing activities) to assess the security risks faced by the entity's computer network. The simulated browsing activities occur according to the web browsing behavior patterns of the entity's users, and are subject to attacks in the simulated external threat environment and mitigations in the simulated internal protections. The web infection model can be customized to model various mitigation strategies. The risk assessing module 120 can am simulations on the customized models to determine the effectiveness of the mitigation strategies based on the simulation results.

The interface module 130 provides a control interface for users to configure the web infection model (e.g., parameters such as frequency of vulnerability discovery and configurations of internal mitigation mechanisms) and control the model simulations. The interface module 130 may also communicate with other computer systems or applications regarding data related to constructing the web infection model and/or simulation results.

The data store 140 stores data used by the risk assessment system 100. Examples of the data stored in the data store 140 include the web infection model and data related to constructing the model, and results of running simulations on the model. The data store 140 may be a database stored on a non-transitory computer-readable storage medium.

Example Processes for the Risk Assessment System

Figure 2:
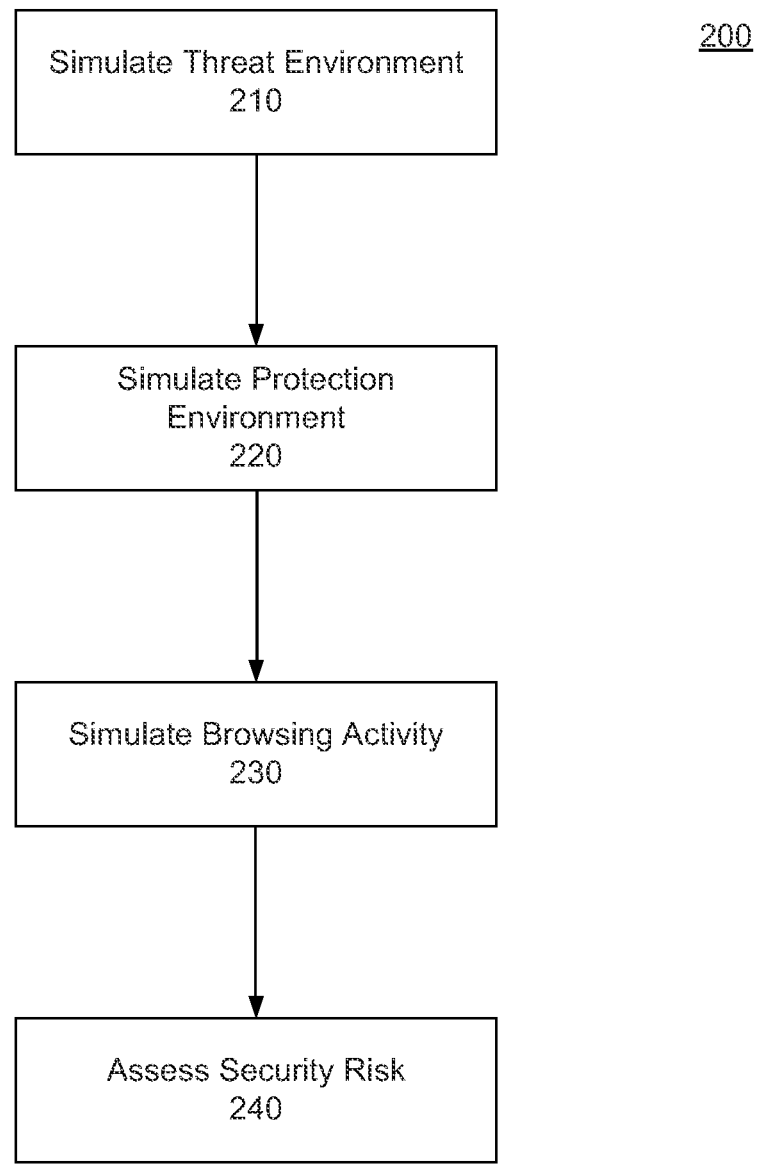
FIG. 2 is a diagram of an example of a method for the system shown in FIG. 1 to assess security risks.

FIG. 2 is a flow diagram that illustrates one example of a process 200 for the risk assessment system 100 to assess security risks faced by an entity's computer network. Other examples perform the steps in different orders and/or perform different or additional steps than the ones shown.

At step 210, the risk assessment system 100 constructs the web infection model and uses the model to simulate a threat environment in which security vulnerabilities are exploited to infect network traffic and spread malware. At step 220, the risk assessment system 100 simulates an internal protection environment within the entity's computer network and/or a computer system inside the network. The internal protection environment includes update management and mitigation mechanisms such as anti-virus applications and firewalls. At step 230, the risk assessment system 100 simulates web browsing activities taking place on the computer system. The browsing activities may involve visiting websites compromised due to exploitations of security vulnerabilities and receiving malware from the compromised websites. The malware may be detected and its damage mitigated by the mitigation mechanisms. Updates addressing the security vulnerabilities may have been applied to the computer system, and thereby preventing or limiting damages of the malware. Alternatively, the malware may infect the computer system and/or cause damages. At step 240, the risk assessment system 100 assesses the security risks of the entity's computer network based on results of the model simulation.

Web Infection Model

Figure 3:
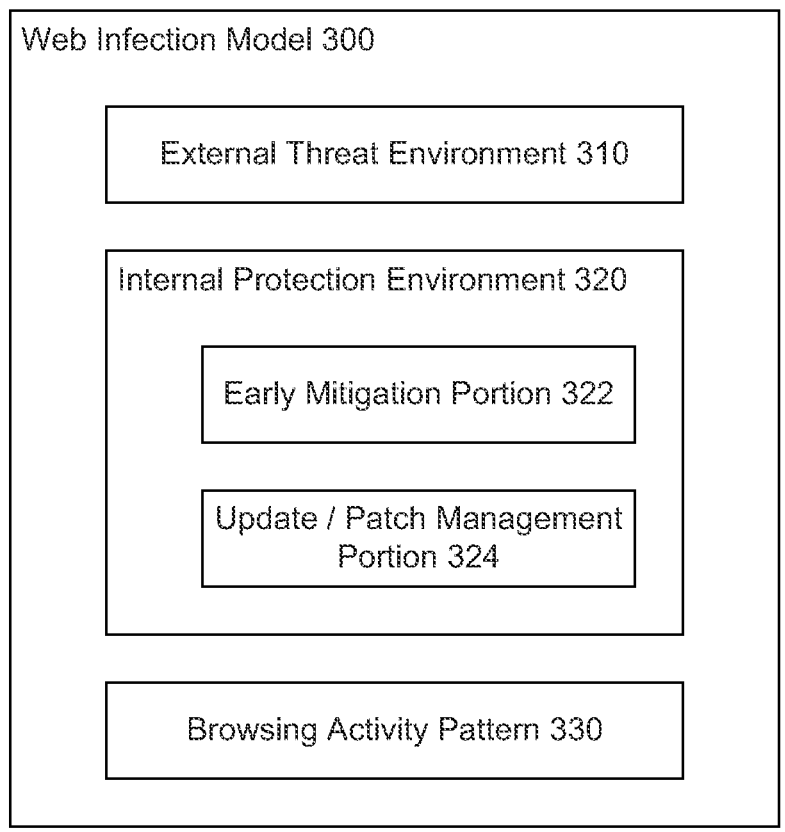
FIG. 3 is a diagram of an example of a web infection model.

FIG. 3 is a block diagram that illustrates one example of a web infection model 300. As shown, the web infection model 300 includes an external threat environment 310, an internal protection environment 320, and an internal browsing environment 330.

The external threat environment 310 simulates security vulnerabilities that may be exploited by attackers to compromise websites, infect web traffic, and/or attack computer systems. A security vulnerability is a weakness which allows an attacker to reduce the information assurance of an application, system, and/or platform (collectively called the "target application"). The number and the severity of vulnerabilities for a particular target application can be determined based on historical data (e.g., security reports disclosing vulnerabilities) for that target application. In addition, the external threat environment 310 models the likelihood of a security vulnerability being exploited and the scale that the exploits might be used across the websites on the Internet.

Figure 4:
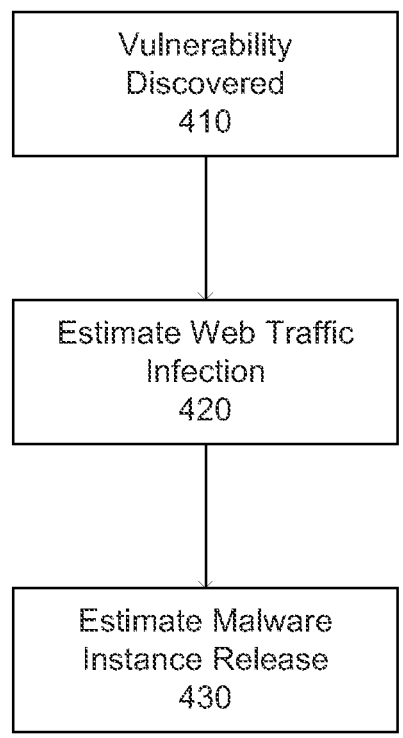
FIGS. 4 through 7 are diagrams of an example of a method for the web infection model shown in FIG. 1 to assess security risk.

FIG. 4 is a flow diagram illustrating an example of a process 400 for the external threat environment 310 to simulate an external threat environment in which security vulnerabilities of one or more target applications are exploited to compromise websites and infect network traffic. At step 410, the external threat environment 310 periodically discovers security vulnerabilities. The discovery of a vulnerability may indicate the public disclosure of the vulnerability. The interval between vulnerability discoveries can be determined based on the target application's relevant historical vulnerability data of disclosed vulnerabilities from sources such as the National Vulnerability Database. For example, assuming 150 vulnerabilities affecting the target product have been disclosed within a year, the external threat environment 310 discovers security vulnerabilities of that target application by selecting a vulnerability from the disclosed vulnerabilities approximately (or in average) every 2.43 days.

The external threat environment 310 estimates the portion of infected web traffic caused by attacks exploiting the discovered vulnerability at step 420. The external threat environment 310 may determine whether the discovered vulnerability is critical based on measurements such as a measurement assigned to the vulnerability by a source such as the Common Vulnerability Scoring System (CVSS). In one example, a vulnerability is determined critical if the CVSS assigns a score between 7 and 10 to the vulnerability. The external threat environment 310 may determine a likelihood that the discovered vulnerability will be exploited based on factors such as whether the vulnerability can be remotely exploited, whether the vulnerability can inject code or operating system (OS) commands, whether the vulnerability can cause errors such as buffer errors and input validation errors, and whether the vulnerability can disclose information or escalate privilege. If the discovered vulnerability is determined both not critical and unlikely to be exploited, then the external threat environment 310 ignores the vulnerability. Otherwise, if the vulnerability is determined critical or likely to be exploited, the external threat environment 310 estimates the portion of web traffic infected by attacks exploiting the discovered vulnerability (also called the "traffic infection rate").

In one example, the external threat environment 310 classifies websites into multiple categories, and estimates traffic infection rates for websites in each category separately. Examples of the categories include factual websites such as news websites, social networking websites, websites providing search services (also called "search websites"), websites providing technology related information or services (also called "technology websites"), websites providing services and/or contents related to gaming, sex, shopping, music, and/or video (also called "game-sex-shop-music websites"), and websites that do not fall into any of the above categories (also called "other websites"). Websites in different categories may be subject to different security measures and as a result the infection rates of web traffic of different categories vary. For example, traffic of websites hosting adult videos is usually more likely to be infected with malware than traffic of news websites. The infection rate for websites in a category is determined based on factors such as trends regarding exploits and/or attacks for websites in that category (e.g., information in security reports), the type of the target application (e.g. platform-dependent or platform-agnostic), and trends regarding exploits and/or attacks for that type of applications.

In one example, the external threat environment 310 determines whether the discovered vulnerability is likely to appear in one or more exploit kits. An exploit kit is a malware development tool designed to facilitate the development and/or distribution of malware instances exploiting security vulnerabilities. Malware instances are unique variations of malicious software designed to exploit a particular security vulnerability. The likelihood of a vulnerability to appear in exploit kits is determined based on factors such as whether the vulnerability is determined critical, the potential for uniform exploitation across different OS platforms (e.g., whether the application is OS-agnostic), and trends regarding exploits/attacks for the underlying target application. In one example, the external threat environment 310 determines that only critical vulnerabilities are likely to appear in exploit kits. Whether a vulnerability is included in exploit kits affects the traffic infection rates caused by attacks exploiting the vulnerability and the number of malware instances created to exploit the vulnerability.

In one example, the infection rates take into account of whether the discovered vulnerability is likely to appear in exploit kits. The infection rate of a category of website can be determined using the following equation:

$$\text{Website Infection Rate} = \text{Website Category Rate} \times \text{Infection Factor}, \quad (1)$$

where Website Infection Rate measures the exposure of traffic of websites in the underlying website category to the exploitation of the underlying vulnerability, Website Category Rate represents the percentage of infected traffic for websites in the underlying category and can be determined in accordance with security reports generated based on large volumes of web traffic history, and Infection Factor represents a factor reflecting the impact of including a vulnerability in exploit kits on general web traffic. For example, assuming the infected web traffic globally due to exploit kit operations is approximately 65%, the value of the Infection Factor for vulnerabilities likely to be included in exploit kits is set to be 0.65, and 0.35 for vulnerabilities unlikely to be included in any exploit kits.

The web traffic infection rate of a vulnerability changes over time. The infection rate is at its peak when the vulnerability is newly discovered and gradually decreases until the vulnerability is outdated. The decrease rate and the outdate period can be configured accordingly for each category based on information from security reports.

The external threat environment 310 estimates malware instance releases that exploit the discovered vulnerability at step 430. Vulnerabilities that are exploited in an ad-hoc manner (i.e., without using an exploit kit) and vulnerabilities exploited through exploit kits do not have the same impact. This difference is captured by distinguishing the number of malware instances that can potentially be created for each scenario. Given the recent advances in exploit kit development with encoding and general obfuscation techniques, it has been observed that the malware instances created by exploit kits typically are 10 to 1,000 times greater than the malware instances created by non-exploit kits attacks. In one example, the external threat environment 310 determines that 1 to 50 malware instances are generated to exploit a vulnerability if that vulnerability is not included in exploit kits, and 500 to 1,000 malware instances are generated if the vulnerability is included in exploit kits. The ranges can be configured and the actual number of malware instances can be generated randomly within these ranges. The changing rate of the malware instances as time elapses can also be configured or determined based on historical data. The malware instances are passed on to the internal protection environment 320.

Referring back to FIG. 3, the internal protection environment 320 simulates defensive mechanisms available to a computer system within the entity's computer network. Defensive mechanisms include update management and early mitigation mechanisms such as network gateways (e.g., firewalls) and anti-virus applications. As shown, the internal protection environment 320 includes an early mitigation portion 322 and an update management portion 324.

The early mitigation portion 322 simulates early mitigation mechanisms that may mitigate dangers imposed by malware instances on the computer system, and estimates the effectiveness of such mechanisms. Examples of the early mitigation mechanism include behavior-based malware detection mechanisms and signature-based malware detection mechanisms.

Figure 5:
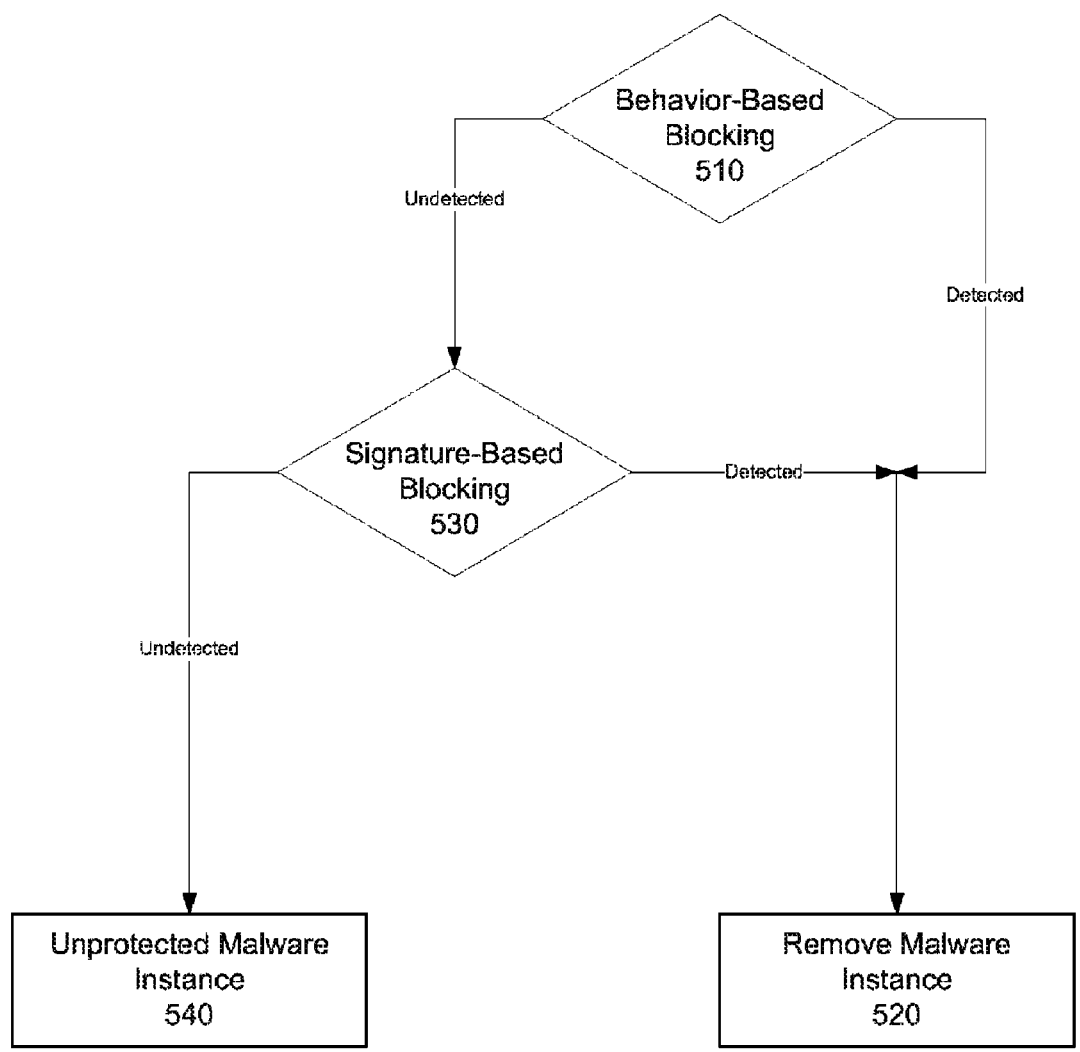

FIG. 5 is a flow diagram illustrating an example of a process 500 for the early mitigation portion 322 to mitigate risks of malware instances in a computer system. At step 510, the early mitigation portion 322 applies the behavioral-based malware detection mechanism to detect malware instances based on their observed behaviors in the computer system and/or the entity's network. The level of effectiveness of this mechanism can be a numeric value (e.g., between 0 and 1) which can be configured according to the specific hardware and/or software deployed and their specific configuration, and can be determined based on information such as laboratory test results and user feedbacks. If a malware instance is detected by applying this mechanism, the early mitigation portion 322 removes the malware instance from within the computer system (e.g., by applying a heuristics-based prevention mechanism) at step 520.

If a malware instance was not detected by the behavioral-based malware detection mechanism, the early mitigation portion 322 applies a signature-based malware detection mechanism against the malware instance at step 530. The level of effectiveness of this mechanism can be determined based on historical information about the underlying anti-virus application. In reality, the signature development and/or release by an anti-virus vendor have some delays, and similarly the signature deployment on the computer system also has a delay. These delays cause the level of effectiveness to increase as time elapses, and can be simulated using a delay factor determined based on actual delays reflected in historical data and can be vendor specific and configurable. If a malware instance is detected by applying this mechanism, the early mitigation portion 322 removes the mechanism instance from within the computer system at step 520.

If neither the behavioral-based malware detection mechanism nor the behavioral-based malware detection mechanism detects a malware instance, the early mitigation portion 322 determines that the malware instance is an unprotected malware instance that might potentially infect the computer system at step 540.

In addition to or instead of the above-described early mitigation mechanisms, the early mitigation portion 322 may apply other early mitigation mechanisms such as heuristics-based malware detection mechanism and network security gateway protecting computer systems inside the entity's computer network from vulnerability exploits delivered from websites.

Referring back to FIG. 3, the update management portion 324 simulates software updating performed in the computer system, and estimates its effectiveness against the malware instances. A software update (also called a "patch") is a piece of software designed to cure one or more vulnerabilities of a computer program or its supporting data. Once an update curing a security vulnerability is installed in a computer system, the update protects the computer system from exploitations of that vulnerability.

Figure 6:
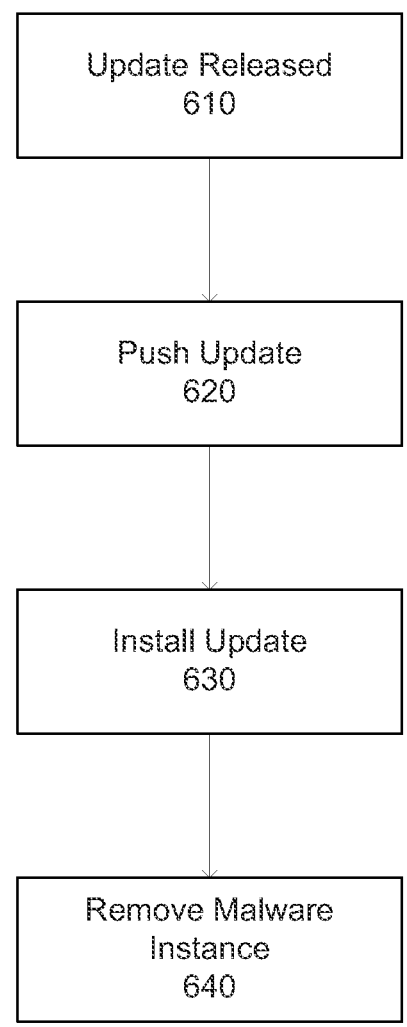

FIG. 6 is a flow diagram illustrating an example of a process 600 for the update management portion 324 to simulate a software updating process. At step 610, an update addressing one or more security vulnerability of a target application is released by the vendor of the target application. The update can be a scheduled standard update designed to cure all vulnerabilities known by the time of release for which no update has been released, or an out-of-band critical patch designed to cure a recently disclosed critical vulnerability. A scheduled standard update is typically released according to the vendor's normal update cycle (e.g., monthly, quarterly). To simulate the scheduled standard updates, the update management portion 324 releases such updates in a configurable regular update release interval. A critical patch is typically released soon after a critical vulnerability is disclosed in order to mitigate damage. In one example, the update management portion 324 simulates critical patch releases based on the likelihood of the discovered vulnerabilities being critical—if a vulnerability has a high likelihood of being critical, then the update management portion 324 is more likely to issue a critical patch for that vulnerability, and vice versa.

At step 620, the released update is pushed to computer systems within the entity's computer network for installation. There may be a delay after an update becomes released and before the update is pushed to the computer systems. The time delay may be due to testing procedures designed to ensure compatibility and stability according to the entity's practices and policies. The update management portion 324 may simulate such a delay based on historical data (e.g., a probability distribution of past delays).

At step 630, the pushed update (critical or standard) is installed on the computer system, and as a result the computer system is protected against exploitations of vulnerabilities the update is designed to cure, including all malware instances exploiting such vulnerabilities. The installed update also removes malware instances exploiting such vulnerabilities from within the computer system at step 640.

Referring back to FIG. 3, the internal browsing environment 330 simulates web browsing activities within the entity and assesses security risks caused by such activities. Even though at certain points in time a computer system might be vulnerable to a malware instance for which the computer system has no protection, whether an infection caused by the malware instance will actually take place depends on a user of the computer system to visit a compromised website that includes the malware instance. Simulating web browsing activities enables the internal browsing environment 330 to assess security risks caused by such activities.

Figure 7:
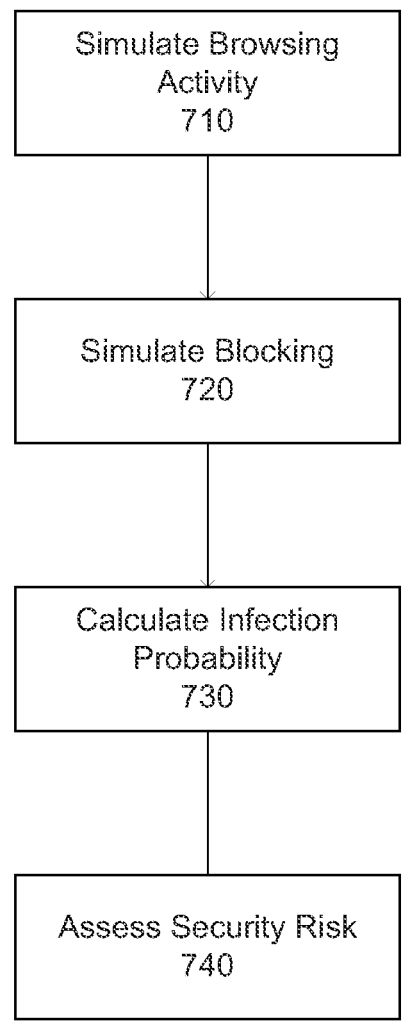

FIG. 7 is a flow diagram illustrating an example of a process 700 for the internal browsing environment 330 to simulate web browsing activities and assess security risks. In step 710, the internal browsing environment 330 simulates the web browsing activity of a user in the entity by initiating a web request. The web request can be configured to take place periodically (e.g., every hour or every minute). To capture the typical user browsing behaviors relevant to the entity, the internal browsing environment 330 uses generic web browsing behavior information or internal historical browsing information to model the browsing activities. For example, the internal browsing environment 330 may simulate web browsing activities according to the following distribution pattern: approximately 20% of the total web browsing are visiting factual websites, 14% for visiting social networking websites, 30% for search websites, 10% for technology websites, 9% for game-sex-shop-music websites, and 17% for other websites. These probabilities (e.g., likelihood of websites in a particular category are visited) can be assigned to the various website categories, and can be dynamically adjusted to reflect the web traffic direction changes within the entity.

At step 720, the internal browsing environment 330 determines whether a website blocking mechanism is enabled, and if so determines whether the blocking mechanism prevents the (simulated) user from accessing the requested website. The blocking mechanism may restrict access to certain websites such as blacklisting a single website or websites belonging to a certain category (e.g. adult websites). In one example, the internal browsing environment 330 applies a blocking factor to affected website categories to account for the blocking mechanism. For example, if the value of the blocking factor for all categories is 0.1, then 10% of the simulated web traffic is discarded as being blocked. The blocking factors for each website category can be adjusted separately to reflect the entity's strategy towards different categories.

At step 730, the internal browsing environment 330 calculates probability of infections caused by browsing activities visiting websites in different categories. The risk exposure of one browsing activity, visiting a website, can be determined using the following equation:

$$\text{Risk Exposure} = \text{Website Category Portion} \times \text{Malware Instance Portion}, \quad (2)$$

where Risk Exposure represents a probability of the computer system where the browsing takes place getting infected by the resulting web traffic, Website Category Portion represents the proportion of infected (and unblocked) traffic for the underlying website category at the time when the browsing activity takes place, and Malware Instance Portion represents the proportion of malware instances (compared to total malware instances for the underlying vulnerability) that the computer system has no protection in place at the time when the browsing activity takes place.

At step 740, the internal browsing environment 330 determines whether the computer system is infected or not as a result of the simulated browsing activity based on the probability (Risk Exposure), and does the same for other simulated browsing activities. The internal browsing environment 330 assesses the overall security risks of the entity's network based on all the infections caused by the simulated browsing activities.

Figure 8:
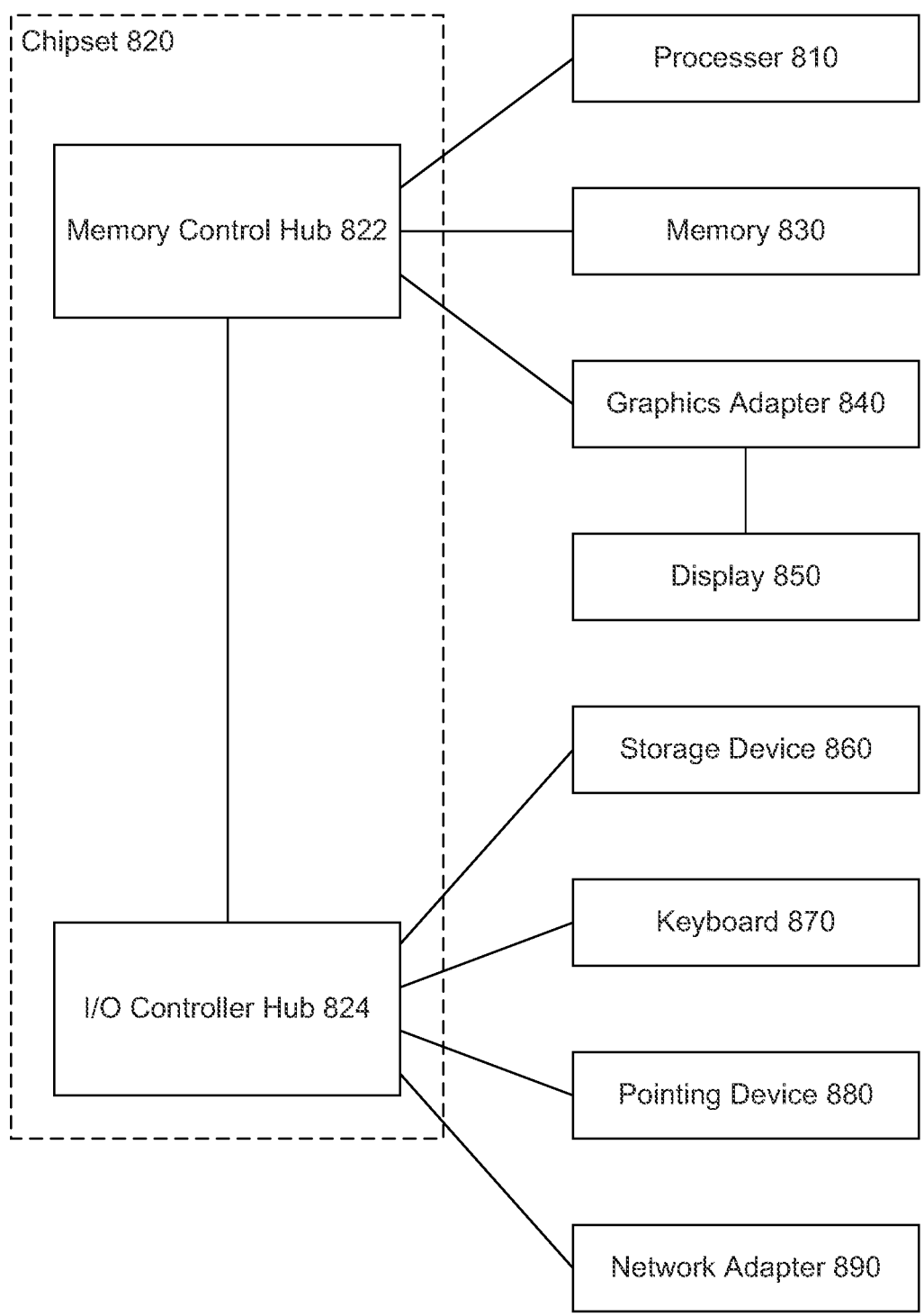
FIG. 8 is a diagram of an example of a computer system.

In one example, the entities shown in FIGS. 1 through 7 are implemented using one or more computer systems. FIG. 8 is a high-level block diagram illustrating an example computer system 800. The computer system 800 includes at least one processor 810 coupled to a chipset 820. The chipset 820 includes a memory controller hub 822 and an input/output (I/O) controller hub 824. A memory 830 and a graphics adapter 840 are coupled to the memory controller hub 822, and a display 850 is coupled to the graphics adapter 840. A storage device 860, a keyboard 870, a pointing device 880, and a network adapter 890 are coupled to the I/O controller hub 824. Other examples of the computer system 800 have different architectures.

The storage device 860 is a non-transitory computer-readable storage medium such as a hard drive, compact disk read-only memory (CD-ROM), DVD, or a solid-state memory device. The memory 830 holds instructions and data used by the processor 810. The pointing device 880 is a mouse, track ball, or other type of pointing device, and is used in combination with the keyboard 870 to input data into the computer system 800. The graphics adapter 840 displays images and other information on the display 850. The network adapter 890 couples the computer system 800 to one or more computer networks.

The computer system 800 is adapted to execute computer program modules for providing functionality described herein. As used herein, the term "module" refers to computer program logic used to provide the specified functionality. Thus, a module can be implemented in hardware, firmware, and/or software. In one example, program modules are stored on the storage device 860, loaded into the memory 830, and executed by the processor 810.

The types of computer systems 800 used by entities can vary depending upon the example and the processing power required by the entity. For example, a source system 110 might comprise multiple blade servers working together to provide the functionality described herein. As another example, a destination system 120 might comprise a mobile telephone with limited processing power. A computer system 800 can lack some of the components described above, such as the keyboard 870, the graphics adapter 840, and the display 850.

One skilled in the art will recognize that the configurations and methods described above and illustrated in the figures are merely examples, and that the described subject matter may be practiced and implemented using many other configurations and methods. It should also be noted that the language used in the specification has been principally selected for readability and instructional purposes, and may not have been selected to delineate or circumscribe the inventive subject matter. Accordingly, the disclosure of the described subject matter is intended to be illustrative, but not limiting, of the scope of the subject, matter, which is set forth in the following claims.

What is claimed is:

1. A method for assessing a security risk of a computer network, comprising:
    simulating a threat environment of the computer network, wherein the simulating the threat environment comprises determining an infection rate for websites in one of a plurality of website categories;
    simulating a protection environment of the computer network and a computer system in the computer network;
    simulating network activity of the computer system; and
    assessing the security risk of the computer network based at least in part on the simulated threat environment, the simulated protection environment, and the simulated network activity of the computer system.

2. The method of claim 1, wherein simulating the threat environment comprises:
    determining a likelihood of the vulnerability to appear in an exploit kit,
    wherein the security risk is assessed based at least in part on the likelihood of the vulnerability to appear in the exploit kit.

3. The method of claim 1, wherein simulating the protection environment comprises:
simulating an early mitigation mechanism for detecting a malware instance, the early mitigation mechanism comprising one of the following: a behavior-based malware detection mechanism, and a signature-based malware detection mechanism.

4. The method of claim 1, wherein simulating the protection environment comprises:
simulating an update management process for installing an update for curing the vulnerability.

5. The method of claim 1, wherein simulating the threat environment comprises:
assessing the security risk of the computer network based at least in part on combination of the infection rate with the simulated protection environment and the simulated network activity of the computer system.

6. The method of claim 1, wherein simulating the threat environment comprises:
estimating a likelihood of an exploitation of the vulnerability and the exploitation to be present on the website.

7. The method of claim 6, further comprising:
determining a likelihood of a malware instance to be transmitted from the website onto the computer system caused by exploitation of the vulnerability based at least in part on the likelihood of exploitation of the vulnerability and the simulated network activity of the computer system,
wherein assessing the security risk of the computer network comprises assessing the security risk of the computer network based at least in part on the simulated protection environment and the likelihood of the malware instance.

8. A non-transitory computer-readable storage medium having computer program instructions recorded thereon for assessing a security risk of a computer network, the computer program instructions comprising instructions for:
simulating a threat environment of the computer network, wherein the simulating the threat environment comprises determining an infection rate for websites in one of a plurality of website categories;
simulating a protection environment of the computer network and a computer system in the computer network;
simulating network activity of the computer system; and
assessing the security risk of the computer network based at least in part on the simulated threat environment, the simulated protection environment, and the simulated network activity of the computer system.

9. The storage medium of claim 8, wherein simulating the threat environment comprises:
determining a likelihood of the vulnerability to appear in an exploit kit,
wherein the security risk is assessed based at least in part on the likelihood of the vulnerability to appear in the exploit kit.

10. The storage medium of claim 8, wherein simulating the protection environment comprises:
simulating an early mitigation mechanism for detecting a malware instance, the early mitigation mechanism comprising one of the following: a behavior-based malware detection mechanism, and a signature-based malware detection mechanism.

11. The storage medium of claim 8, wherein simulating the protection environment comprises:
simulating an update management process for installing an update for curing the vulnerability.

12. The storage medium of claim 8, wherein simulating the threat environment comprises:
assessing the security risk of the computer network based at least in part on combination of the infection rate with the simulated protection environment and the simulated network activity of the computer system.

13. The storage medium of claim 8, wherein simulating the threat environment comprises:
estimating a likelihood of an exploitation of the vulnerability and the exploitation to be present on the website.

14. The storage medium of claim 13, wherein the computer program instructions further comprises instructions for:
determining a likelihood of a malware instance to be transmitted from the website onto the computer system caused by exploitation of the vulnerability based at least in part on the likelihood of exploitation of the vulnerability and the simulated network activity of the computer system,
wherein assessing the security risk of the computer network comprises assessing the security risk of the computer network based at least in part on the simulated protection environment and the likelihood of the malware instance.

15. A risk assessment system, comprising:
a processor communicatively coupled to a memory:
a modeling module with instructions executable by the processor to simulate a threat environment of the computer network, simulate a protection environment of the computer network and a computer system in the computer network, and simulate network activity of the computer system, wherein the simulated threat environment comprises to determine an infection rate for websites in one of a plurality of website categories; and
a risk assessing module with instructions executable by the processor to assess the security risk of the computer network based at least in part on the simulated threat environment, the simulated protection environment, and the simulated network activity of the computer system.

* * * * *